Aug. 12, 1924.
M. CURRAN
1,505,008
WIND AND DUST SHIELD
Filed May 10, 1923    2 Sheets-Sheet 1
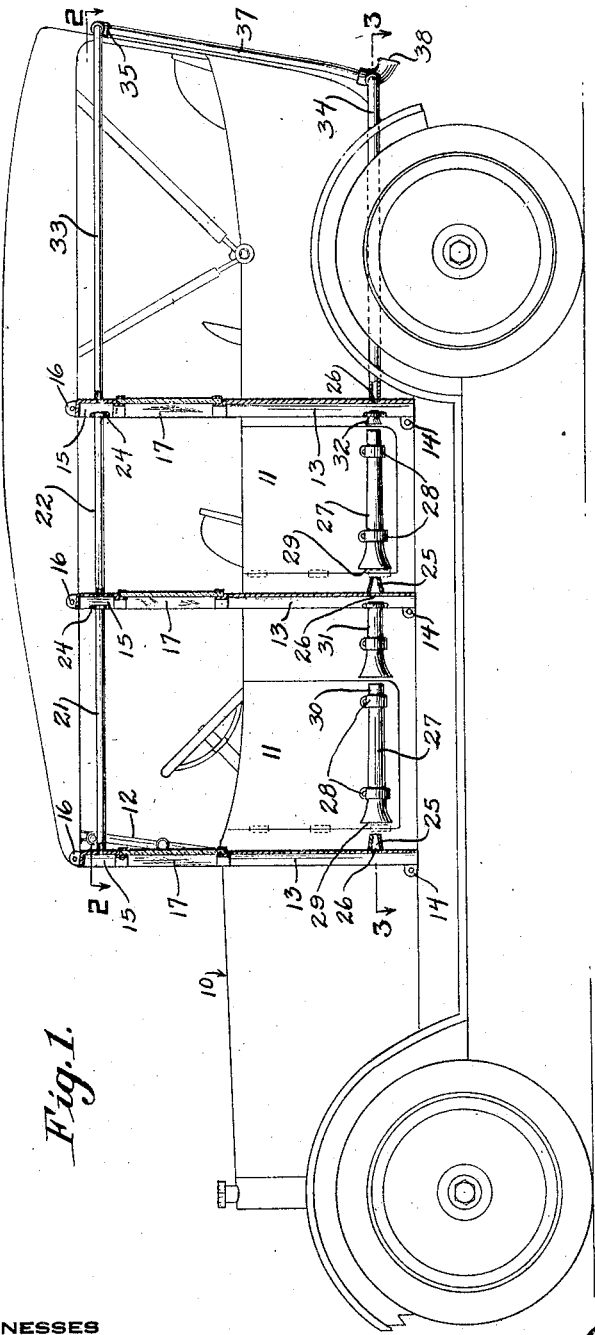
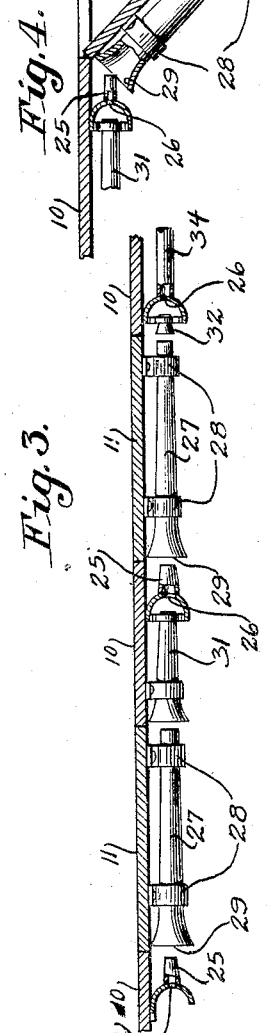
WITNESSES
Louis Goodman
E. N. Lovewell
INVENTOR
Michael Curran
BY
E. G. Siggers
ATTORNEY

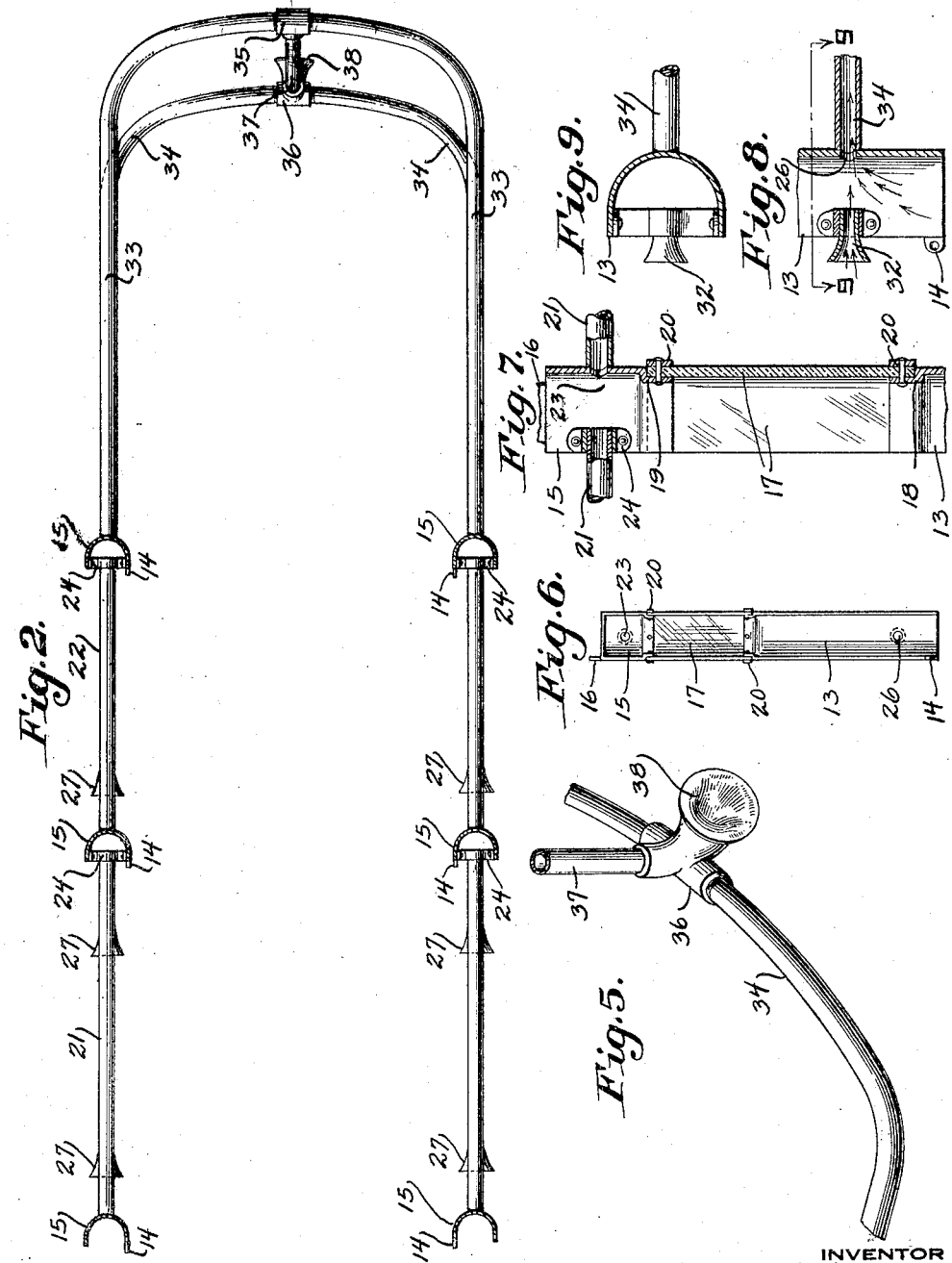

Patented Aug. 12, 1924.

1,505,008

UNITED STATES PATENT OFFICE.

MICHAEL CURRAN, OF DANVILLE, PENNSYLVANIA.

WIND AND DUST SHIELD.

Application filed May 10, 1923. Serial No. 638,022.

*To all whom it may concern:*

Be it known that I, MICHAEL CURRAN, a citizen of the United States, residing at Danville, in the county of Montour and State of Pennsylvania, have invented a new and useful Wind and Dust Shield, of which the following is a specification.

This invention relates to a wind and dust shield especially designed for attachment to automobiles and particularly useful when the automobile is driven over dusty roads for preventing the dust from reaching the occupants thereof.

In the usual phaeton body with the wind shield extending across the front, although the occupants are shielded from the direct force of the wind, a rapid forward travel causes a vacuum to be created behind the wind shield so that air is sucked in from the open sides, and when traveling over dusty roads the currents of dust-laden air coming in from both sides meet within the body and the eddies thus set up cause a great amount of dust to settle upon the occupants, resulting in great inconvenience, as well as an untidy appearance.

The object of the present invention is to overcome these disadvantages without sacrificing any of the comforts and benefits derived from riding in an open car. In order to obtain these results I have provided a system of troughs, funnels and air conducting pipes which may be attached to the body of the automobile and are arranged in such manner as to counteract the suction created by rapid travel and to direct the air currents around the sides of the body to the rear thereof, thus preventing the dust from entering and settling within the body of the automobile. I have also devised a special construction to permit the opening of the doors in the side of the body without interfering materially with the operation of the invention.

The principle of the invention and the structural details thereof will be best understood from the following detailed description taken in connection with the accompanying drawings, which illustrate the preferred form of the invention.

In the drawings:

Figure 1 represents an automobile in side elevation with my invention attached thereto, parts of the latter being shown in section.

Figure 2 is a horizontal sectional view of the invention, the section being taken substantially on the line 2—2 of Figure 1.

Figure 3 is a sectional detailed view taken on the line 3—3 of Figure 1.

Figure 4 is a similar view showing the operation of one of the doors, with my invention attached thereto.

Figure 5 is a detailed perspective view of the rear portion of the invention.

Figure 6 is a front elevation of one of the troughs.

Figure 7 is an enlarged vertical section through one of the troughs.

Figure 8 is a detailed view showing the direction of the air currents leading into the rearwardly extending pipes.

Figure 9 is a detailed view on the line 9—9 of Figure 8.

As illustrated in the drawings the invention is attached to an automobile body 10 of the usual phaeton type having side doors 11, and the usual wind shield 12 extending across the front thereof above the hood. The invention includes a plurality of troughs substantially semi-circular in cross-section and extending vertically at various points along the sides of the automobile body. These troughs are preferably located between and at each side of the side doors, and each trough comprises a lower section 13 provided with ears 14 for securing the same to the side of the automobile and an upper section 15 provided with an ear 16 adapted to be secured to the top of the automobile. The upper and lower sections of the trough are connected by an intermediate section 17, composed of glass or other transparent material, so that the view of the occupants of the automobile may not be obstructed. The sections 13 and 15 are preferably provided with offset ends as indicated at 18 and 19 respectively, to form seats for the ends of the transparent portion 17, which is firmly secured thereto by the outer bands 20.

The upper sections 15 of the troughs are connected by pipes or air conduits 21 and 22, the troughs being provided with openings 23 leading into the forward ends of these conduits. The rear end of each conduit section is secured in a bracket 24 extending between the edges of the trough whereby it is held in alinement with the next section of conduit leading toward the rear of the automobile.

While the upper sections 15 of the troughs are held in rigid alinement, it is necessary to provide a different construction for connecting the lower sections 13 in order to permit the opening of the doors 11. To this end the section 13 in front of each door is provided with a comparatively short nipple 25 surrounding the outlet 26 in the bottom of the trough, this nipple terminating short of the door 11 when the latter is open. On each door a section of conduit 27 is secured by means of brackets 28, and is provided at its forward end with a funnel-shaped mouth 29, which is adapted to receive and direct the currents of air passing through the nipple 25, and is also large enough to permit the opening of the door 11 as illustrated in Figure 4. The outlet ends 30 of the conduit sections 27 are in alinement with the funnel-shaped sections 31 and 32 secured to the sides of the body in the rear of the doors 11, and constituting with the sections 27 and nipples 25 a substantially continuous air conduit from front to rear.

From the rearmost trough 13, the rear conduits are continued by the pipes 33 and 34 which lead around to the rear of the body where they meet each other at 35 and 36, the upper and lower conduits being connected by the upright central pipe 37 which leads to a flared outlet 38 located centrally of the rear end near the bottom.

When an automobile, equipped with my invention, travels forwardly, the currents of air which would otherwise be drawn around the ends of the wind shield 12 into the body of the vehicle are intercepted by the vertical troughs, including the several sections 13, 17 and 15. The region of low pressure at the rear of the vehicle, caused by its forward movement, aids in the creation of a rearward current through the outlets 26 and the pipes 27 and 34, which sucks in a large proportion of the dust particles contained in the air intercepted by the vertical troughs and discharges the same through the outlet 38 at the rear of the vehicle. Thus the dust is prevented from being sucked into the interior of the body to any great extent, while the occupants of the vehicle enjoy all the pleasures of an open car, with an entirely unobstructed view. The sections 25, 27, 31 and 32 are so arranged that the doors may swing freely, while there is no interference to the free conduct of the air through the same and into the sections 34.

While I have shown and described the specific details of construction by means of which the invention may be carried out, it is to be understood that this is merely illustrative and that various modifications may be made therein within the scope of the appended claims without departing materially from the principle of the invention.

What is claimed is:

1. The combination with a touring car of the phaeton type, of substantially vertical troughs arranged on the sides of the vehicle between, in front of, and in rear of the doors respectively, said troughs having their open sides facing the front, and having outlets through their bottoms, and conduits connected with the outlets and leading to the rear of the vehicle, said conduits having separate intermediate sections secured to the doors with the ends of said intermediate sections spaced from the remaining portions of the conduits sufficiently to permit the doors to open.

2. The combination with a touring car of the phaeton type, of a plurality of troughs arranged on the sides of the vehicle between, in front of, and in rear of the doors respectively, said troughs having their open sides facing the front, and having outlets through their bottoms near their upper and lower ends respectively, conduits connecting the upper outlets, funnel-shaped conduit sections secured to the doors and in alinement with the lower outlets but spaced therefrom sufficiently to permit the doors to open, and conduit sections leading from the outlets of the rearmost trough and discharging at the rear of the vehicle.

In testimony, that I claim the foregoing as my own, I have hereto affixed my signature.

MICHAEL ×his mark CURRAN.

Witnesses to mark:
RALPH HUNTINGTON,
JOSEPH REILY.